UNITED STATES PATENT OFFICE.

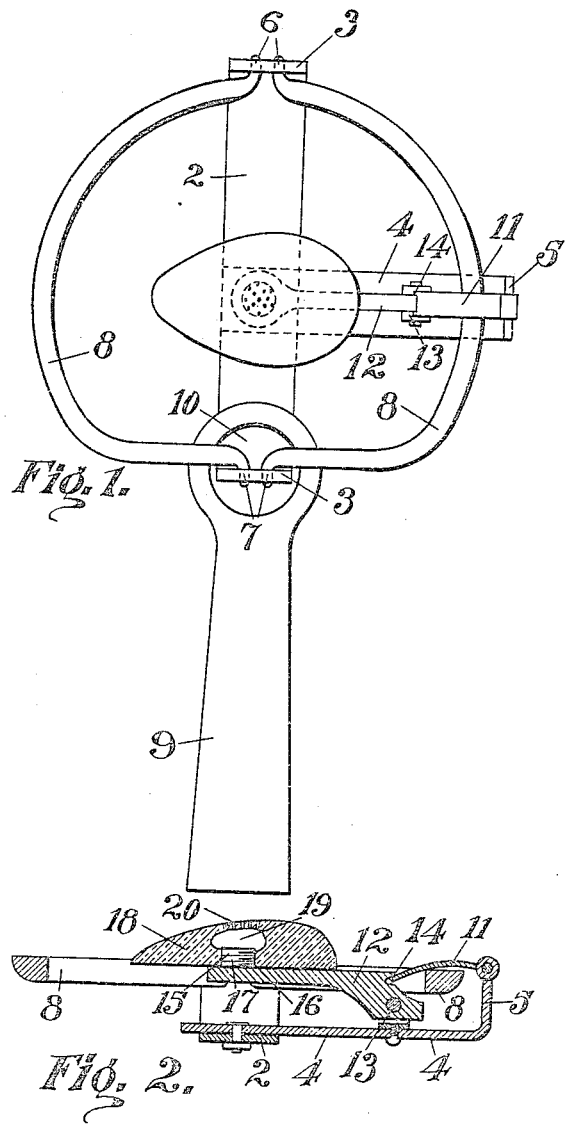

BYRON G. BURNS, OF CALEXICO, CALIFORNIA.

ANIMAL-TRAP.

1,243,588.  Specification of Letters Patent.  Patented Oct. 16, 1917.

Application filed March 30, 1917. Serial No. 158,641.

*To all whom it may concern:*

Be it known that I, BYRON G. BURNS, a citizen of the United States, residing at Calexico, in the county of Imperial and State of California, have invented new and useful Improvements in Animal-Traps, of which the following is a specification.

My invention relates to bait pans for animal traps and has for its primary objects, to provide a bait pan which will prevent an animal from eating the bait, and to provide a bait pan of an attractive shape and color.

With these and other objects in view which will be hereinafter fully described and particularly pointed out in the claim, the invention consists in the novel construction and arrangement of parts illustrated in the accompanying drawings forming a part of this specification, in which:—

Figure 1 is a top plan view of an animal trap embodying my invention,

Fig. 2 is a sectional view in side elevation of the mechanism illustrated in Fig. 1.

Like characters of reference indicate like parts in the various views.

In the drawings 1 designates the frame of an animal trap. This frame comprises a longitudinal member 2 having upturned ends 3, and a transverse member 4 extending at right angles to said longitudinal member and having one end secured thereto and an upturned portion 5 formed at its other end. A pair of holes 6 are formed in the upturned ends 3 and are in axial alinement with each other. A second pair of holes 7 are formed in the upturned ends 3 and are in axial alinement with each other. A jaw 8 is pivoted in each pair of holes and adapted to move from a horizontal to a vertical position. When the jaws 8 are in a vertical position they are adapted to grasp an animal and hold him firmly. A flat spring 9 has its one end affixed to the longitudinal member 2 and has its other end formed with a large hole 10 embracing the jaws 8. A latch 11 is pivoted upon the upturned end 5 of the transverse member 4 and is adapted to overlie the adjacent jaw 8 when it is in its horizontal position. A trigger 12 is pivoted on a bracket 13 of the transverse member 4 and has a notch 14 adapted to engage the end of the latch 11 to hold it against the influence of spring 9 which is transmitted to it through the adjacent jaw 8 when the trap is set. The above described trap is of usual construction and needs no further description herein.

The free end of the trigger 12 has an upwardly extending end 15. Screw threads 16 are formed upon the outer surface of the end 15. A body 18 is provided which is substantially egg-shaped and is colored to resemble an egg. This body 18 may be formed of glass or any other suitable substance. A screw threaded recess 19 is formed in the underside of the body 18 and is adapted to be screwed upon the screw threads of the end 15. A series of small holes 20 are formed in the body 18 and communicate with the recess 19.

In setting the trap the jaws 8 are swung to their horizontal positions against the influence of the spring 9 and the latch 11 brought into proper position relative thereto and with the notch 14 of the trigger. The recess 17 is filled with bait, preferably egg whites or yolks and the body 18 is then screwed upon the screw threads 16. The scent of the contents of the recess 17 issues through the holes 20. An animal is attracted by the scent of the bait and by the shape and color of the body 18. By reason of the fact that the holes 20 are very small the animal cannot get at the bait and eat it or destroy it.

Having thus fully described my invention, I claim:—

A bait pan for animal traps, comprising a body having a screw threaded recess therein and having small holes communicating with said recess, and a trigger having screw threads formed thereon engaging said first mentioned screw threads.

In testimony whereof I affix my signature.

BYRON G. BURNS.

Copies of this patent may be obtained for five cents each, by addressing the "Commissioner of Patents, Washington, D. C."